(12) United States Patent
Vimercati (10) Patent No.: US 11,508,264 B2
(45) Date of Patent: Nov. 22, 2022

(54) LABEL AND MANUFACTURING METHOD

(71) Applicant: PILOT ITALIA S.p.A., Milan (IT)

(72) Inventor: Giancarlo Vimercati, Milan (IT)

(73) Assignee: PILOT ITALIA S.p.A., Milan (IT)

( * ) Notice: Subject to any disclaimer, the term of this patent is extended or adjusted under 35 U.S.C. 154(b) by 781 days.

(21) Appl. No.: 16/303,560

(22) PCT Filed: May 4, 2017

(86) PCT No.: PCT/IB2017/052590
§ 371 (c)(1),
(2) Date: Nov. 20, 2018

(87) PCT Pub. No.: WO2017/199119
PCT Pub. Date: Nov. 23, 2017

(65) Prior Publication Data
US 2020/0312198 A1    Oct. 1, 2020

(30) Foreign Application Priority Data

May 20, 2016   (IT) .................... 102016000052213

(51) Int. Cl.
   *G09F 3/02*       (2006.01)
   *B32B 7/12*       (2006.01)
   (Continued)

(52) U.S. Cl.
   CPC .............. *G09F 3/0288* (2013.01); *B32B 7/12* (2013.01); *B32B 37/02* (2013.01); *B32B 37/12* (2013.01);
   (Continued)

(58) Field of Classification Search
   CPC ........ B32B 2038/0076; B32B 2405/00; B32B 2519/00; B32B 37/02; B32B 37/12;
   (Continued)

(56) References Cited

U.S. PATENT DOCUMENTS 5,135,125 A     8/1992   Andel et al.
5,738,381 A *   4/1998   Treleaven ............ B65D 23/003
                                                    283/81
(Continued)

FOREIGN PATENT DOCUMENTS

| CN | 201685500 U | 12/2010 |
|----|-------------|---------|
| EP | 0 356 574 A2 | 3/1990 |
| EP | 2 246 266 A1 | 11/2010 |

OTHER PUBLICATIONS

English translation of EP0356574.*
(Continued)

*Primary Examiner* — Sonya M Sengupta
(74) *Attorney, Agent, or Firm* — Merchant & Gould P.C.

(57) ABSTRACT

A method of manufacturing a label with a suspension handle includes providing a first layered material including a support layer and a releasable first front layer. A front surface of the first front layer is coated with a first detachment promoter layer, leaving a zone free of the first promoter layer. A handle area of the first promoter layer is coated with a second detachment promoter layer. A second layered material includes a second front layer and an adhesive layer. While the second detachment promoter layer is wet, the components are coupled, so the adhesive layer adheres to the free zone. The second detachment promoter layer-adhesive layer solidifies to bind the layers. In the second layer thickness, a suspension handle is separated from the handle area. A secondary label is superposed only over the first layer detachment promoter, and forms a label surround in the first front layer.

17 Claims, 9 Drawing Sheets

(51) Int. Cl.
*B32B 37/02* (2006.01)
*B32B 37/12* (2006.01)
*B32B 38/00* (2006.01)
*B32B 38/10* (2006.01)
*G09F 3/10* (2006.01)

(52) U.S. Cl.
CPC .......... *B32B 38/0012* (2013.01); *B32B 38/10* (2013.01); *B32B 38/145* (2013.01); *G09F 3/10* (2013.01); *B32B 2038/0076* (2013.01); *B32B 2405/00* (2013.01); *B32B 2519/00* (2013.01); *G09F 2003/027* (2013.01); *G09F 2003/0222* (2013.01); *G09F 2003/0247* (2013.01)

(58) Field of Classification Search
CPC ... B32B 38/0012; B32B 38/10; B32B 38/145; B32B 7/12; G09F 2003/0222; G09F 2003/0247; G09F 2003/027; G09F 3/0288; G09F 3/10
See application file for complete search history.

(56) References Cited

U.S. PATENT DOCUMENTS

| | | | | |
|---|---|---|---|---|
| 5,878,901 A | * | 3/1999 | Grosskopf | B32B 27/08 428/101 |
| 6,272,780 B1 | * | 8/2001 | Satamian | B31D 1/0018 40/310 |
| 6,349,974 B1 | * | 2/2002 | Grosskopf | B65D 23/005 156/277 |
| 2006/0057313 A1 | | 3/2006 | Moosheimer et al. | |

OTHER PUBLICATIONS

International Search Report and Written Opinion of the International Searching Authority for International Patent Application No. PCT/IB2017/052590 dated Jul. 24, 2017, 9 pages.

\* cited by examiner

LABEL AND MANUFACTURING METHOD

This application is a National Stage Application of PCT/IB2017/052590, filed 4 May 2017, which claims benefit of Ser. No. 102016000052213, filed 20 May 2016 in Italy and which applications are incorporated herein by reference. To the extent appropriate, a claim of priority is made to each of the above disclosed applications.

FIELD OF THE INVENTION

The present invention relates to a method for manufacturing a label with a handle for suspending a bottle in an overturned position, and a label with a handle for example obtainable with said method.

BACKGROUND OF THE INVENTION

The prior art document EP0356574A2 describes a label with a handle applicable to a bottle in which, when in the non-use position, such a handle protrudes free from an upper edge of the label.

In addition to having the complication of a protruding handle that interferes with the closure area of small volume bottles, this solution involves the main drawback of being a technically complex and costly solution.

The prior art document EP2246266A1, by the same applicant, describes a label provided with a handle made by joining two distinct adhesive films.

As described in this document, a bottom film comprises the indications required to identify the infusion container, while a top transparent film is adherently joined to the bottom film and forms the handle to overturn the container when administering the contents thereof to a patient.

A first drawback associated with this prior art is the fact that the handle remains sticky behind, and therefore more difficult to handle by the staff in charge of its use.

A further drawback associated with this prior art relates to the possible risk of undesired lifting of the handle and/or an auxiliary self-adhesive or service label thereof, both in the application of the label to the bottle and in a condition of use of the same bottle.

SUMMARY OF THE INVENTION

The present invention falls within the above context by aiming to provide a method and a self-adhesive label able to overcome the drawbacks of the prior art.

In particular, the method and label proposed herein have been designed to differentiate the adhesive power to the suspension handle and the secondary label so as to make the handle detachment easy and the re-adhesion of the label to an external support, such as a patient's clinical record, reliable.

This object is achieved by a method of manufacturing a label with a suspension handle comprising steps of: i) providing a first layered material which comprises a support layer and a first front layer joined in a releasable manner; ii) coating a front surface of the first front layer with a first detachment promoter layer, leaving a free zone wherein the first detachment promoter layer is absent; iii) adjustably coating a handle area of the first detachment promoter layer with a second detachment promoter layer in a liquid or semi-liquid form; iv) providing a second layered material comprising a second front layer and an adhesive layer; v) when the second detachment promoter layer is still wet, joining the products of steps iii) and iv) in a coupled material, so that the adhesive layer adheres at least to the free zone of the first layered material; vi) solidifying the second detachment promoter layer in contact with the adhesive layer, in order to bind the layers; vii) at least in the thickness of the second layer separating a suspension handle from the handle zone, at least a secondary label of the label in a different area superposed only over the first layer detachment promoter, and forming a label surround in the first front layer.

This object is achieved also by a label with a suspension handle comprising: a first layered material which comprises a support layer and a first front layer joined in a releasable manner; a first detachment promoter layer, coating a front surface of the first front layer leaving a free zone wherein the first detachment promoter layer is absent; a second detachment promoter layer, adjustably coating a handle area of the first detachment promoter layer; a second layered material comprising a second front layer and an adhesive layer, the second material being joined to the first layered material so that the adhesive layer adheres at least to the free zone, and wherein the second detachment promoter layer is solidified in contact with the adhesive layer, in order to bind the layers; wherein at least the thickness of the second layer defines a suspension handle at the handle zone, a secondary label in a different area superposed only over the detachment promoter of the first layer, and wherein the first front layer forms a label surround.

BRIEF DESCRIPTION OF THE DRAWINGS

The object of the present invention will now be described in detail, with the aid of the accompanying drawings, in which:

FIGS. 16 and 17 schematize a label according to the present invention, according to a possible variant, in which the grip portion of the handle and a secondary label portion are partially raised.

DETAILED DESCRIPTION OF THE PREFERRED EMBODIMENTS

The above objects are achieved with a method of manufacturing a label 1 with a suspension handle 2 comprising steps of:

i) providing a first layered material 4 which comprises a support layer 6 and a first front layer 8 joined in a releasable manner;

ii) coating a front surface 10 of the first front layer 8 with a first detachment promoter layer 12 (such as a silicone coating), leaving a free zone 14 wherein said first detachment promoter layer 12 is absent;

iii) adjustably coating a handle area 16 of the first detachment promoter layer 12 with a second detachment promoter layer 18 in a liquid or semi-liquid form;

iv) providing a second layered material 20 comprising a second front layer 28 and an adhesive layer 26';

v) joining the products of steps iii) and iv) in a coupled material 40, so that the adhesive layer 26' adheres at least to the free zone 14 of the first layered material 4 (in particular for forming an anchor foot 46);

vi) solidifying or curing the second detachment promoter layer 18 in contact with the adhesive layer 26' of the second layered material 20, in order to bind said layers 18, 26';

vii) at least in the thickness S1 of the second layer 28 separating ("cutting out", according to a variant) a suspension handle 2 from the handle zone 16, at least a secondary label 34 of such a label 1 in a different area superposed only over the first layer detachment promoter 12, and forming a label surround 38 in the first front layer 8.

For example, the secondary labels 34 may be a plurality. According to a variant, the suspension handle 2 is contained in a label width 100. In other words, such a handle does not protrude outside the second front layer 28.

In one embodiment, the first layered material 4 and/or the second layered material 20 are shaped as a tape, which develops along a predominant development direction X, X'.

According to a further embodiment, the first 8 and/or the second 28 front layer may comprise or consist of a plastic film.

According to an even further embodiment, the first 8 and/or the second 28 front layer may have an average density of about 50-500 g/m2, optionally 70-300 g/m2, for example about 150 g/m2.

In a variant, the front surface 10 of the first front layer 8 and/or a front surface 94 of the second front layer 28 are substantially planar and are optionally printable. In particular, one of or both these surfaces are configured so that graphic layers 56, 58 can be distributed and adhered thereon.

At least the front surface 10 of the first front layer 8 will therefore be visible on a bottle, when label 1 will be applied to the latter.

Advantageously, the support layer 6 acts as a releasable support for the finished label 1, and not just for the first front layer 8.

According to a particularly advantageous embodiment, the first layered material 4 and a precursor 22 of the second layered material 20 comprise corresponding or substantially identical layers. A definition of identical is stated in the following description.

In one embodiment, these layers include, superposed to each other, a support layer 6, a de-adhesive layer 24 (e.g. silicone based), an adhesive layer 26, 26' and first 8/second 28 front layer. According to this variant, step iv) comprises a step of separating, and optionally discarding, the support layer and the de-adhesive layer of precursor 22 upstream of step v).

During step vi), the second detachment promoter layer 18 is then solidified (e.g.: dried) in contact with the adhesive layer 26, so as to bind these layers, and optionally so that the adhesive layer cannot perform its adhesive function as at least partially covered (and thus made inert) by the second detachment promoter layer 18, which is solid.

In other words, the second detachment promoter layer 18 works "by transfer" because, although covering the first detachment promoter layer 12, this second layer 18 is transferred at the adhesive layer 26' so as to make it inert to step vi).

In a further embodiment, the solidification step comprises a solidification or curing step through electromagnetic radiation, for example by using UV or heat.

For example, step vi) could take place upstream of step vii).

According to a variant, the suspension handle 2 comprises at least one grip portion 30, wherein—in step iii)—the handle area 16 also extends at said portion 30.

In the embodiments shown, the grip portion 30 comprises a protruding portion with respect to an outer edge 32, optionally arched, of said handle 2. For example, such a protruding portion is not in adhesive contact with the underlying first front layer 8, by virtue of the double detachment promoter layer.

According to a further variant, step vii) comprises at least one sub-step of making at least one creasing line 42, 44 on the second front layer 28 in order to deform said second layer 28 and facilitate a lifting of a portion, for example peripheral, of the secondary label and/or of suspension handle 2. Advantageously, the creasing line 44 is made at the grip portion 30 to raise a peripheral portion thereof.

In a variant, step vii) comprises at least a first die cutting-creasing step 82, and optionally a second cutting step 84, discussed hereinafter.

According to an embodiment, step vii) is conducted outside the free zone 14, so that in said zone 14 the second front layer 28 forms a single anchor foot 46 of the suspension handle 2, from which a pair of arms 48, 48' extend, connected in the form of a ring to each other.

According to a further embodiment, during step ii) and/or during step iii), the first front layer 8 and/or the first detachment promoter layer 12 are partially covered by one or more protection masks (not shown) that prevent the coating of some zones 52, 50 with the first detachment promoter layer 12 and/or with the second detachment promoter layer 18, in order to modulate the separation force of an edge 32 (such as the outer edge) of the suspension handle 2 and/or of a lifting portion 54 of the secondary label 34.

By way of example, at least one protection mask may comprise dot-shaped protective elements, spaced along the extension of edge 32 and/or of the lifting portion 54 with predetermined density.

With regard to such a density, it will depend on the size of handle 2 and label 34, and the nature of the adhesive layer 26'.

Figure 1:
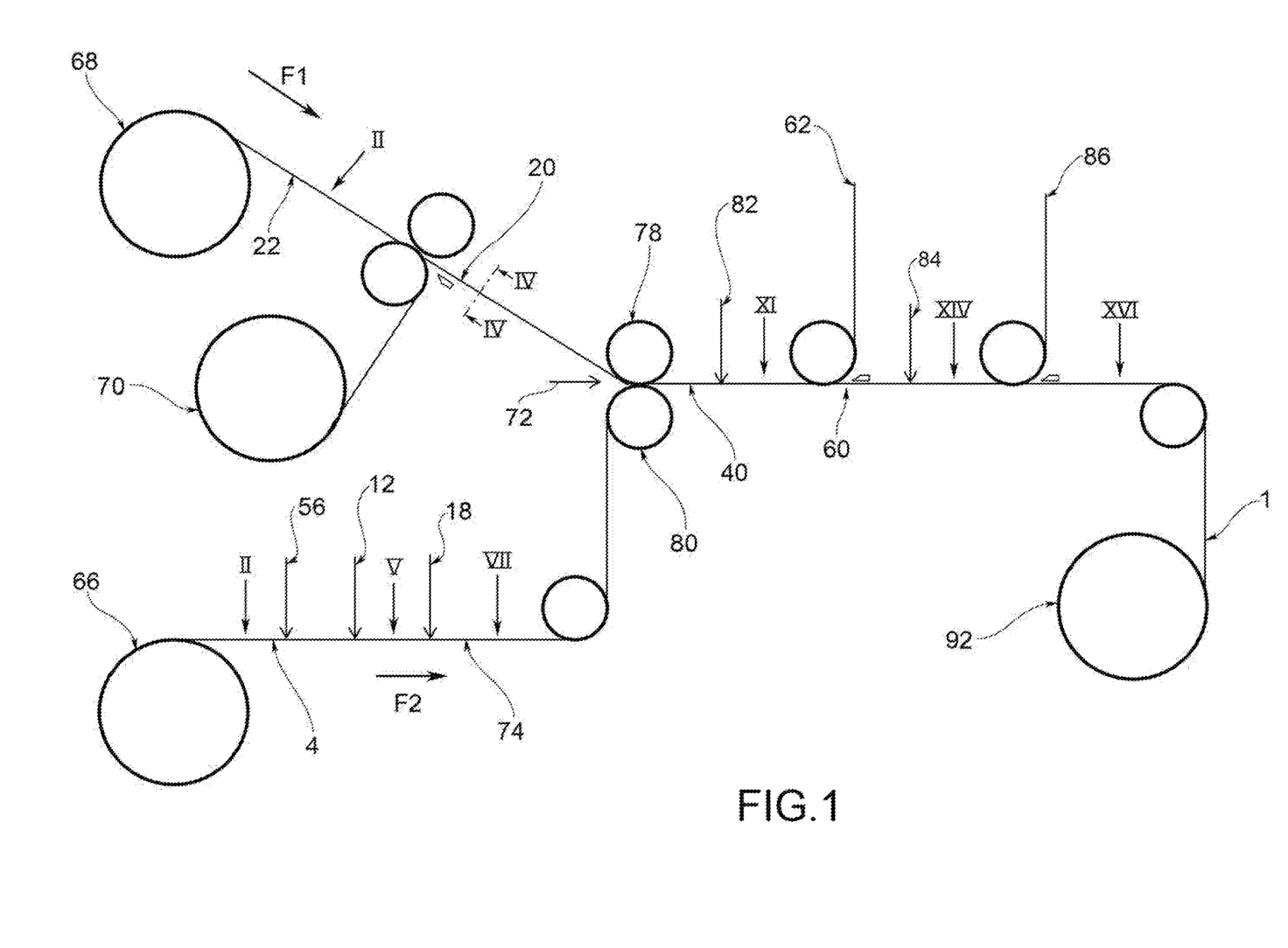
FIG. 1 shows a schematisation of a manufacturing method object of the present invention, according to a possible embodiment.
Figure 2:
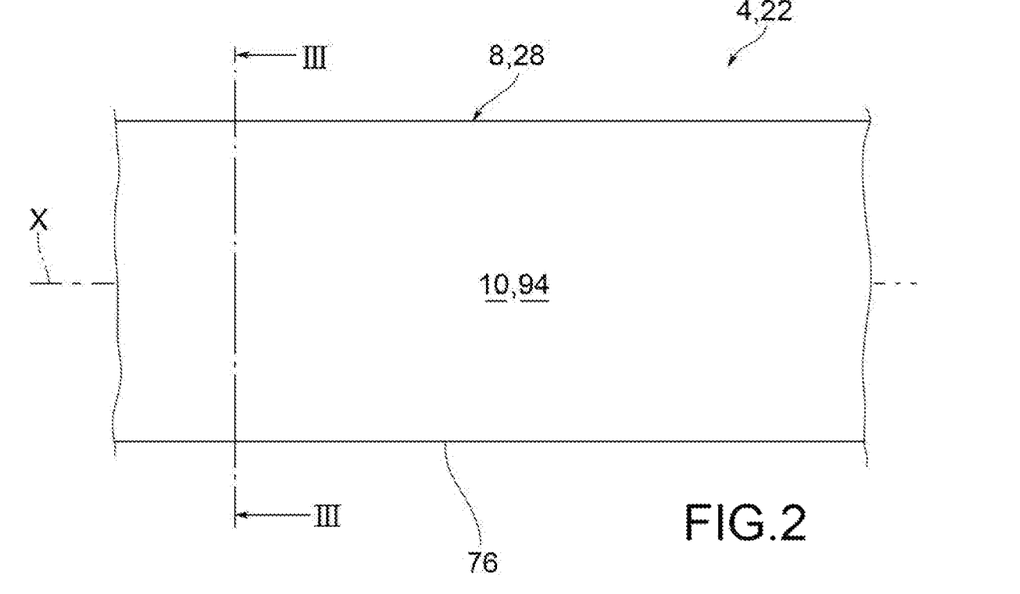
FIGS. 2, 5, 7, 11, 14, 16 shows views of the multilayer material at the positions indicated by numbers II, V, VII, XI, XIV, XVI in FIG. 1 in the direction of the arrow shown each time.
Figure 3:
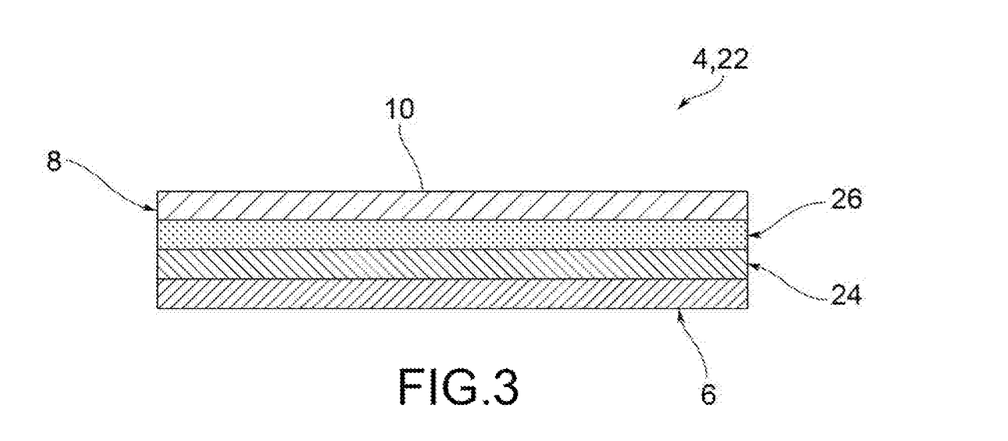
FIGS. 3 and 4 show a section through plane III-III shown in FIG. 2 and through plane IV-IV, shown in FIG. 1, respectively.
Figure 4:
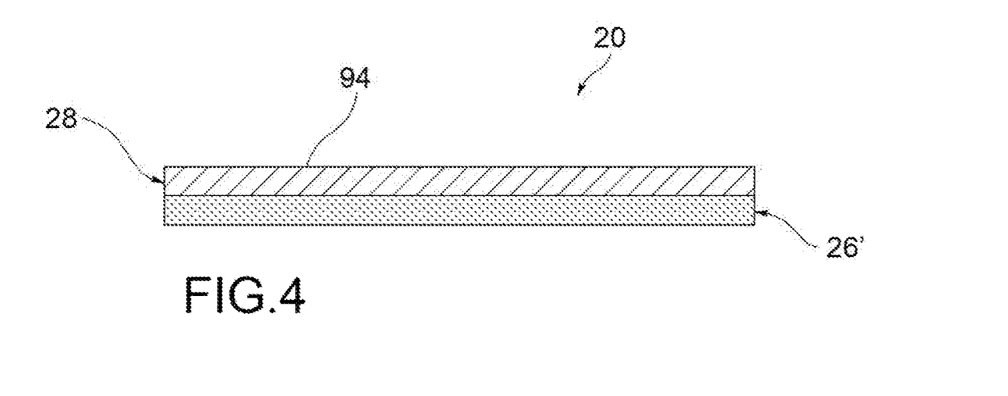

According to an advantageous variant, the second front layer 28 is at least partially transparent to reveal an optional graphic layer 56 distributed on the first front layer 8 (in particular: upstream of step ii) as schematised for example in FIG. 1). In a further variant, the second detachment promoter layer 18 comprises at least one pigment or color to make at least a part of the suspension handle 2 evident.

Specifically, the pigment or color could be mixed with the detachment promoter substance of the second layer 18. According to a further advantageous variant, the method may comprise a step of distributing a second graphic layer 58 on the second front layer 28 to reduce partially (or even eliminate) the transparency of such a layer at least at the secondary label 34.

According to an embodiment, step vii) is followed by at least one step of swarf elimination 60 in which, externally to the suspension handle 2 and/or to the secondary label 34, the second front layer 28 is picked up as a continuous swarf 62, so as to create a lifting step 64 around such a handle 2 and/or such a secondary label 34.

The above objects are also achieved with a label 1 with a suspension handle 2 as described hereinafter.

Since a variant of such a label involves a manufacture by the above method, even where this is not expressly stated, this label may comprise any feature deductible—from a process point of view—from the description above.

Such a label 1 comprises:
- a first layered material 4 which comprises a support layer 6 and a first front layer 8 joined in a releasable manner;
- a first detachment promoter layer 12, coating a front surface 10 of the first front layer 8 leaving a free zone 14 wherein such a first detachment promoter layer 12 is absent;
- a second detachment promoter layer 18, adjustably coating a handle area 16 of the first detachment promoter layer 12;
- a second layered material 20 comprising a second front layer 28 and an adhesive layer 26', such a second material 20 being joined to the first layered material 4 so that the adhesive layer 26' adheres at least to the free zone 14, and wherein the second detachment promoter layer 18 is solidified in contact with the adhesive layer 26', in order to bind such layers 18, 26';

wherein at least the thickness S1 of the second layer 28 defines a suspension handle 2 at the handle zone 16, a secondary label 34 in a different area 36 superposed only over the detachment promoter of the first layer 12, and wherein the first front layer 8 forms a label surround 38.

According to a variant, the suspension handle 2 comprises at least one grip portion 30, wherein the handle area 16 also extends at said portion 30.

According to a further variant, the second front layer 28 defines at least one creasing line 42, 44 so as to facilitate a lifting of a portion, for example peripheral, of the secondary label 34 and/or suspension handle 2.

According to an even further variant, the second front layer 28 comprises a single anchor foot 46 of the suspension handle 2, from which a pair of arms 48, 48' extend, connected in the form of a ring to each other.

Optionally, the pair of arms 48, 48' is rotatable relative to the anchor foot 46 (about an axis of rotation R advantageously common to both arms), to allow the handle to be taken outside of the label, and act as a suspension of a bottle associated therewith, in overturned position.

According to an embodiment, the second front layer 28 is at least partially transparent to reveal an optional graphic layer 56 distributed on the first front layer 8.

Optionally, the second detachment promoter layer 18 may comprise at least one pigment or color to make at least a part of the suspension handle 2 evident, according to a variant without hiding the above first graphic layer.

According to a further embodiment, label 1 comprises a second graphic layer 58 distributed on the second front layer 28 to reduce partially, or to eliminate, transparency of such a layer 28 at least at the secondary label 34.

Advantageously, externally to the suspension handle 2 and/or to the secondary label 34, the second front layer 28 is absent, so as to create a lifting step 64 around such a handle and/or such a secondary label 34.

The manufacturing process schematised in FIG. 1 will now be described, purely by way of example, in which the manufacturing direction F1, F2 develops from left to right according to the orientation of the arrows.

At first, a first layered material 4 and a precursor 22 of a second layered material 20 are fed by two separate feeding reels, indicated by reference numerals 66, 68.

According to an embodiment, the first layered material 4 and precursor 22 are identical materials or corresponding materials, fed by the two different reels 66, 68.

In the present description, the word "identical" means a material with the same layers described, although the different layers may in principle be chemically different between the first layered material and the precursor (and hence also between the first and second layered material).

Such a "common" layered material optionally consists of the following layers, superposed from bottom to top in the following order: a support layer 6, a de-adhesive layer 24 (e.g. silicone), an adhesive layer 26, 26' and first 8/second 28 front layer, for example printable.

Said layers are superposed to each other in a complete manner, with substantially full surface or in a prevailing manner.

From precursor 22 coming from reel 68, the support layer and the de-adhesive layer are promptly removed, which are separated and rewound into a scrap reel 70, while the adhesive layer 26' and the second front layer 28 constitute the second layered material 20 that will continue towards a joining point 72 in direction F1.

According to a variant, a first graphic layer (e.g. containing product information) is distributed/printed on the first layered material 4 coming from reel 66 and a first 12 and a second 18 layer of detachment promoter, such as silicone coating, are superposed on the first graphic layer 56 to obtain the following intermediate material 74.

The detachment promoter layer 12, in contact with the optional graphic layer 56, occupies a smaller surface than the front surface 10 of the first front layer 8.

More precisely, such a layer 12 is applied so as to leave a free area 14 in which such a first detachment promoter layer 12 is absent.

For example, the first detachment promoter layer 12 may be applied in a recessed position relative to a first longitudinal edge 76 of the first layered material 4, so as to provide the second layered material 20—that will be superposed on the intermediate material 74 at the joining point 72—with a free surface to which an anchor foot 46 of the suspension handle 2 formed by such a second layered material 20 may firmly adhere.

The second detachment promoter layer 18, superposed and optionally in contact with the first detachment promoter layer 12, will be adjustably applied with the predetermined position of the suspension handle, in liquid or semi-liquid form.

In the present description, the term "adjustably" means an application on a layer with a specific shape, in this case substantially corresponding to the surface of the suspension handle.

In this regard, suitably shaped masks may be used, which cover the underlying layer 12 to prevent the deposit of the second detachment promoter layer 18 outside the profile of handle 2.

With regard to the expression "semi-liquid" used above, it should be noted that in this description, this term means any liquid substance able to flow, even with low fluidity, in particular at the temperature of execution of step iii).

By way of non-limiting example, this term may mean any viscous, gelatinous and/or pasty substance.

According to a variant, the suspension handle 2 is made evident through a partial pigmentation/coloring of the second front layer 28, which creates a visual or chromatic separation from the first front layer.

Optionally, the partial pigmentation/coloring of the second front layer 28 may be obtained through the characteristics of the second detachment promoter layer 18, which may specifically comprise a pigment/color.

For example, such a pigment or color may be mixed with the detachment promoter substance of the second layer 18, or it may be arranged on the surface of the second detachment promoter layer 18 facing towards the second front layer 28.

The function of the second detachment promoter layer 18 is of course to neutralize/make almost completely inert the adhesion power of the adhesive layer 26' of the second layered material 20, through the transfer mechanism discussed above, in order to facilitate the lifting of (just) the handle.

The intermediate material 74 and the second layered material 20 are then joined in the joining point 72, being in particular joined and pressed by a couple of rolls 78, 80, thus obtaining the coupled material 40.

Downstream of the realization of such a coupled material 40, the second detachment promoter layer 18 is then solidified in contact with the adhesive layer 26', for example by UV radiation, so as to bind such layers 18, 26' and make the adhesive layer 26' "passive".

In a subsequent step, a first die cutting-creasing step 82 and a second die cutting step 84 are carried out, each followed by an elimination of production swarf 62, 86.

During the first die cutting-creasing step 82, a tool may optionally be used configured for folding/creasing, without cutting, the second front layer 28 at the suspension handle 2 (in particular at the grip portion 30 thereof, when provided) and/or the lifting portion 54 of a secondary label 34.

As regards the position of the secondary label 34, the latter will be positioned just above the first detachment promoter layer 12, because the adhesive power of such a label 34 must not be eliminated (or rather must not be made inert) totally as is the case with the suspension handle.

In this way, through the transfer and solidification of the second detachment promoter layer in (semi-)liquid form, it will be possible to make the adhesive layer 26' inert to the suspension handle 2 without affecting the adhesion power of the secondary label 34.

In all other portions, other than the above creasing lines 42, 44, the so-called die cutting depth 82 of the coupled material 40 will develop up to cut at least into the second front layer 28, and optionally also the second detachment promoter layer 18, possibly without affecting layer 12 thereunder.

Figure 12:
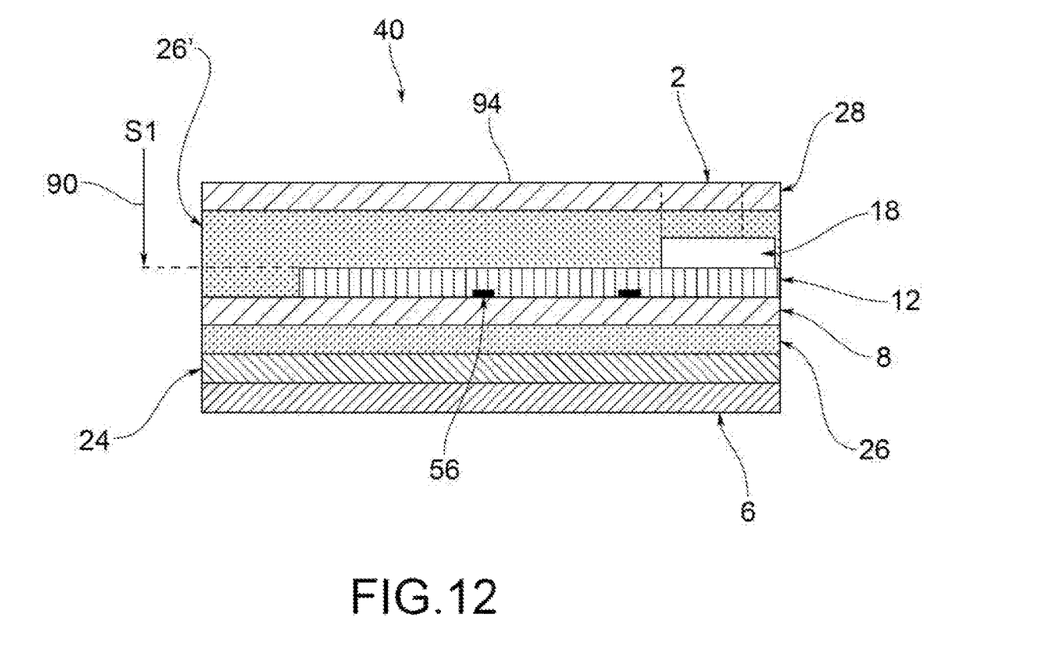
FIGS. 12 and 13 show sections through planes XII-XII, XIII-XIII, respectively, shown in FIG. 11, wherein the arrows schematise the separation, cutting or die depths through the illustrated materials.
Figure 13:
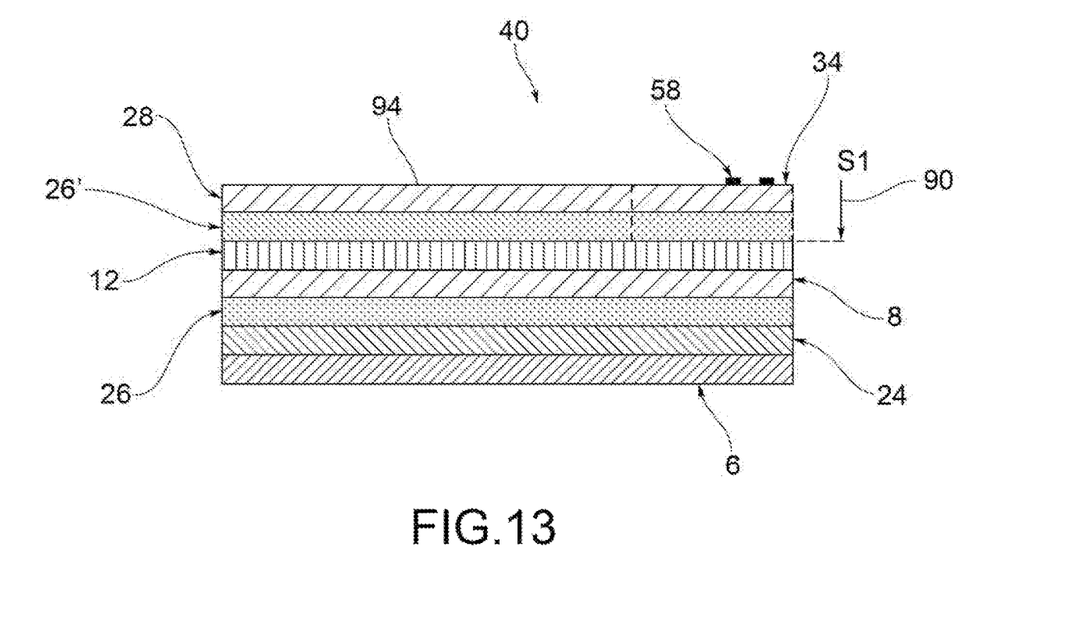
Figure 14:
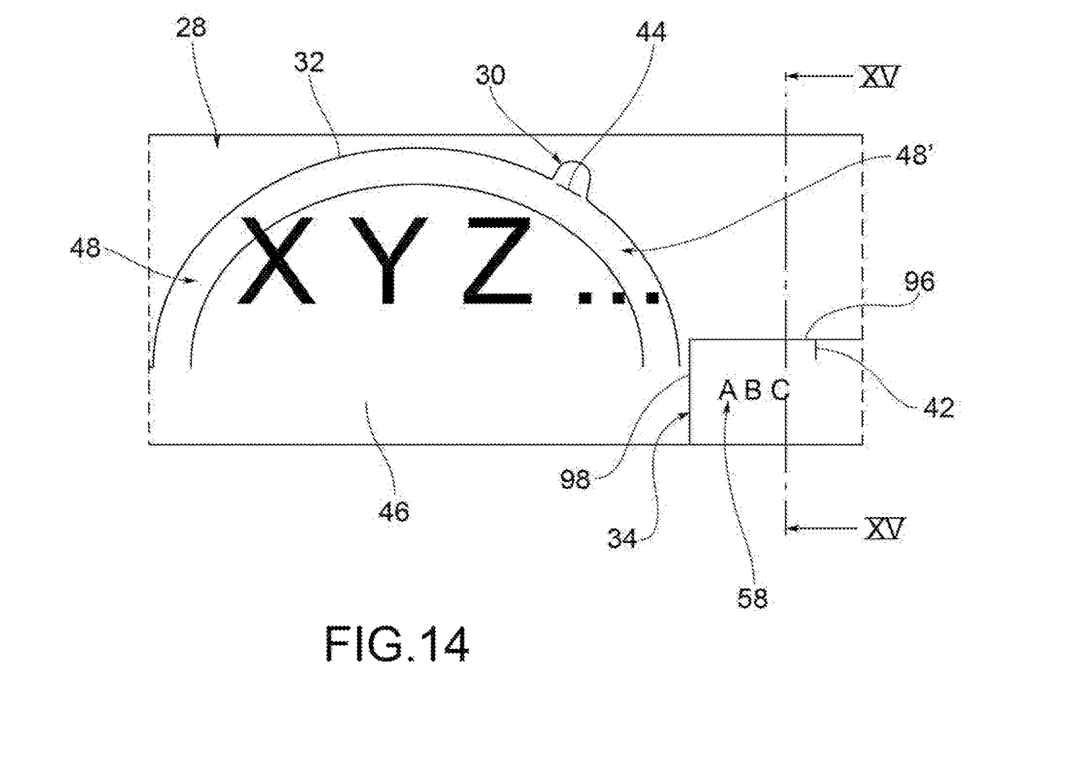

The cutting depth of the coupled material 40 in this first step 82 is indicated by arrows 90 in FIG. 12, 13. The profile of the die of the first die cutting-creasing step 82 is such as to create—both internally and externally—the shape of the handle, and is such as to partially cut out the second front layer 28 (for example: along a pair of sides 96, 98 optionally orthogonal; FIG. 14) around the perimeter of the secondary label 34.

Figure 17:
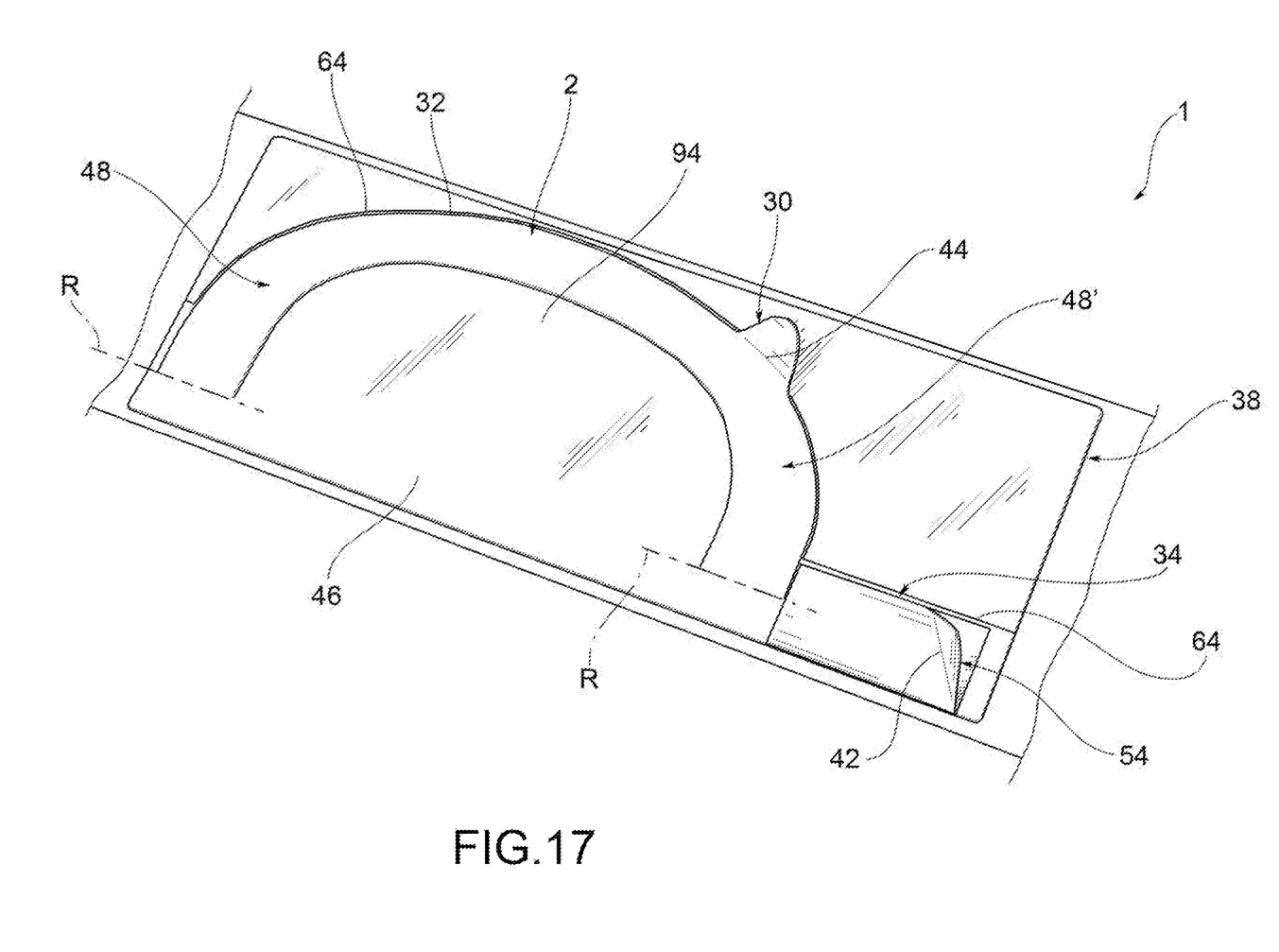

The portion removed as a continuous swarf 62 downstream of the first die cutting-creasing step 82 is therefore a tape having a shape complementary to the lifting step 64 schematised in FIG. 17.

Figure 15:
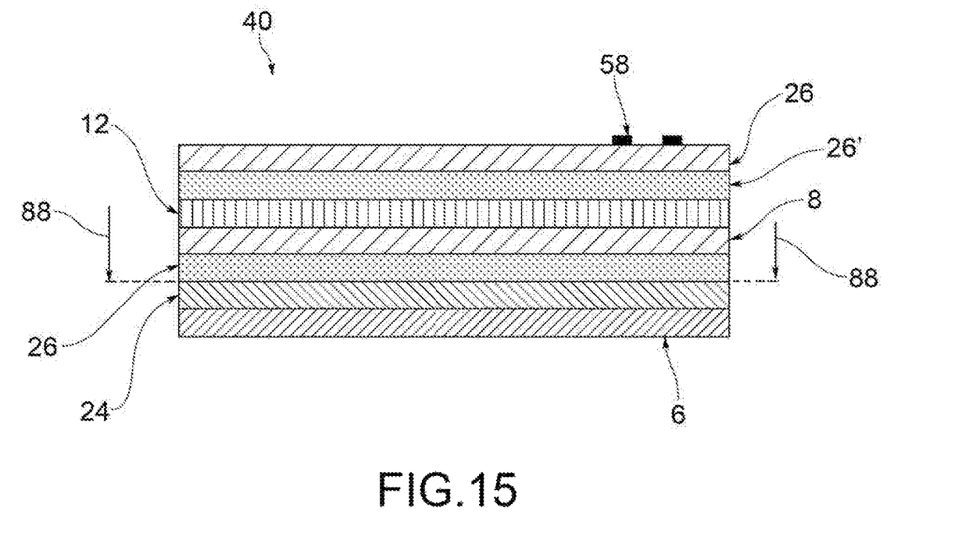
FIG. 15 shows a section through plane XV-XV in FIG. 14.
Figure 16:
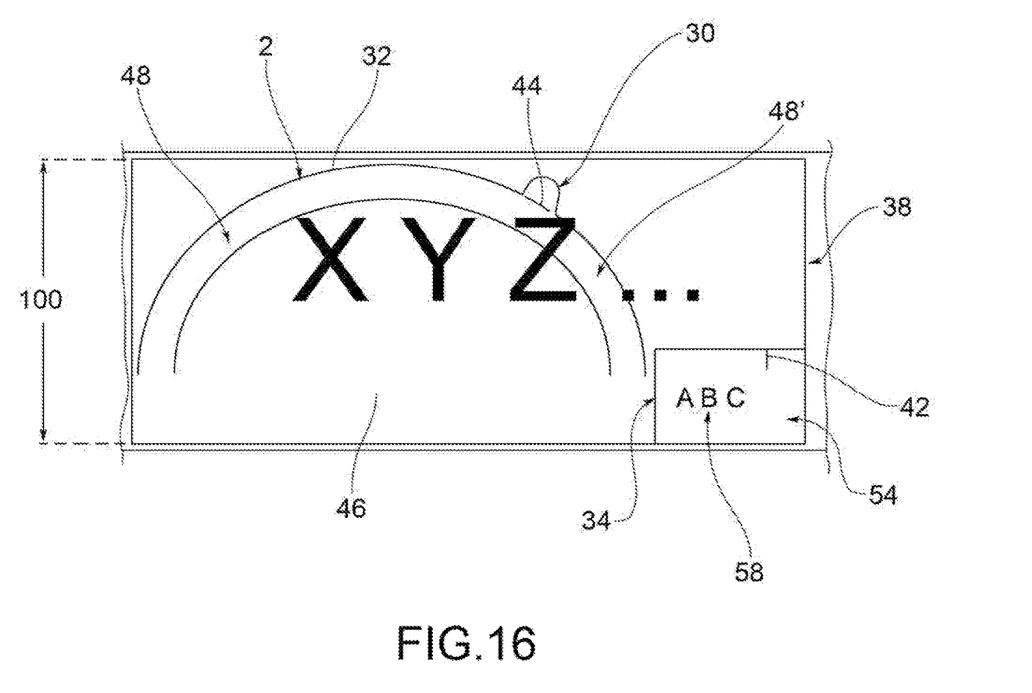

During the second die-cutting step 84, a sharp tool is used, configured to cut into the coupled material 40 from surface 94 thereof at least up to the first front layer 8, and optionally up to the adhesive layer 26 of the original intermediate material 74, as schematised by arrows 88 schematised in FIG. 15.

In any case, within the exposed surface of label 1, this second die-cutting step 84 will cut the label surround 38 around the first front layer 8 and around the suspension handle 2.

FIG. 13 shows the position of the secondary label 34 relative to the first detachment promoter layer 12.

For such a label 34, the first detachment promoter layer 12 may optionally be specially modulated, by depositing the promoter only in some areas, preventing an inert layer to the adhesive substance of said layer from forming underneath the adhesive layer of the secondary label.

Figure 5:
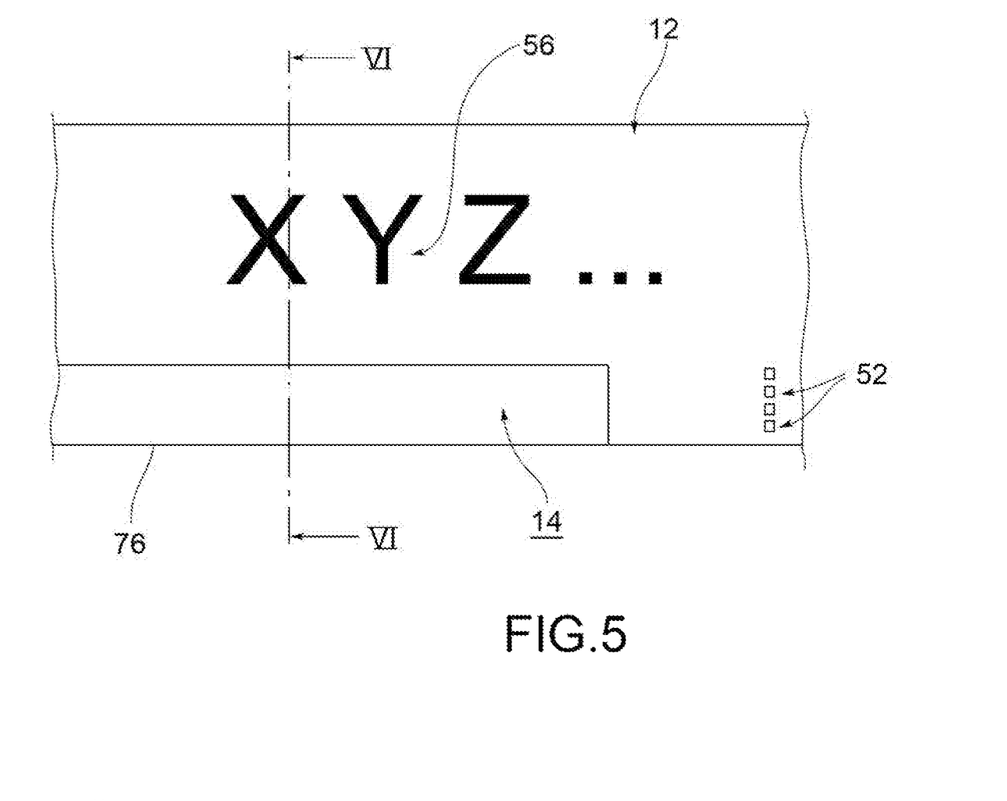
Figure 6:
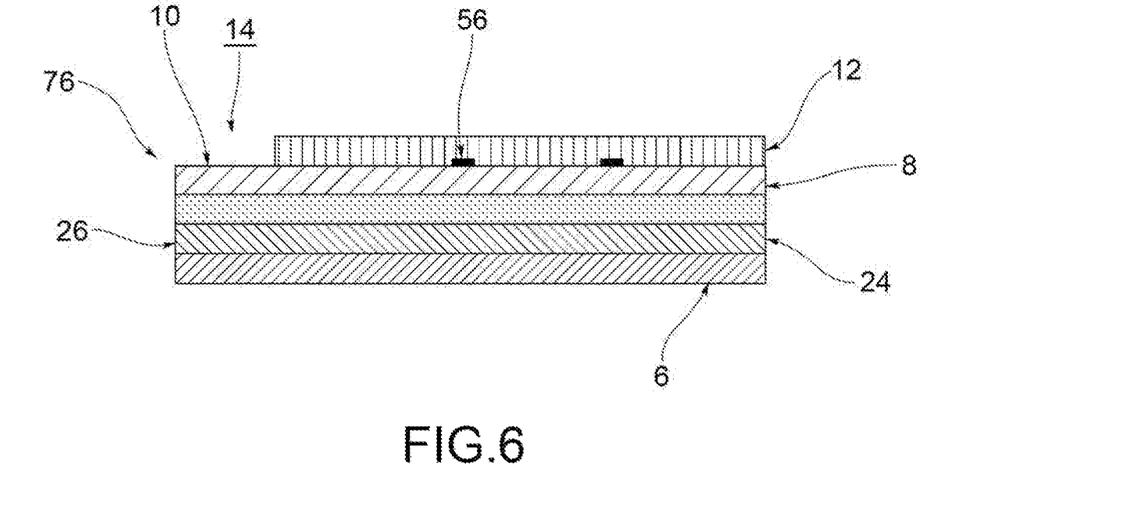
FIG. 6 shows a section through plane VI-VI in FIG. 5.
Figure 7:
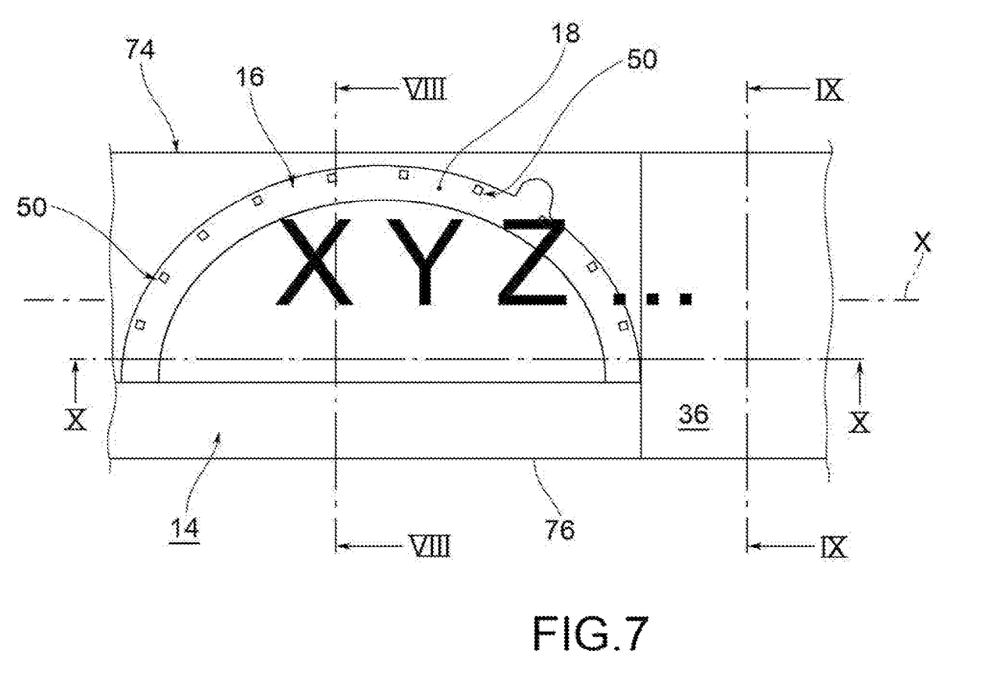
Figure 8:
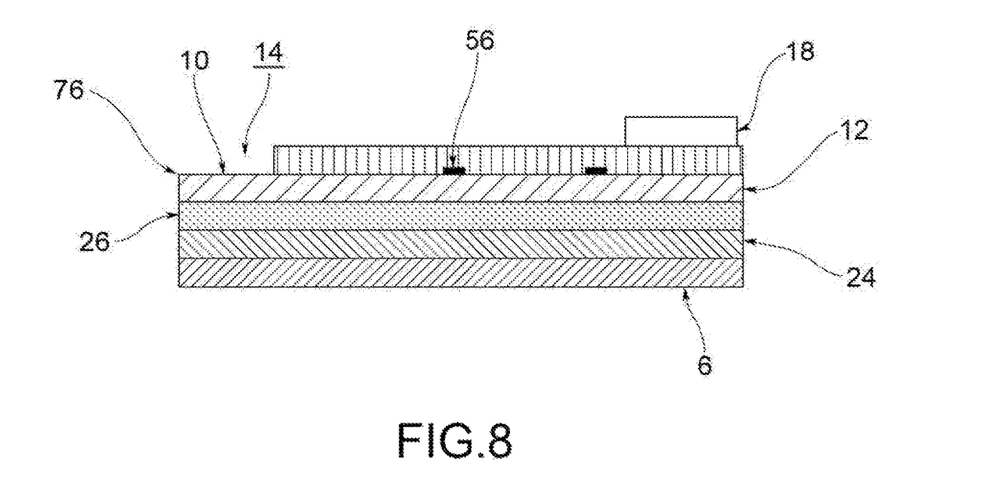
FIGS. 8, 9, 10 show sections through planes VIII-VIII, IX-IX, X-X, respectively, shown in FIG. 7.
Figure 9:
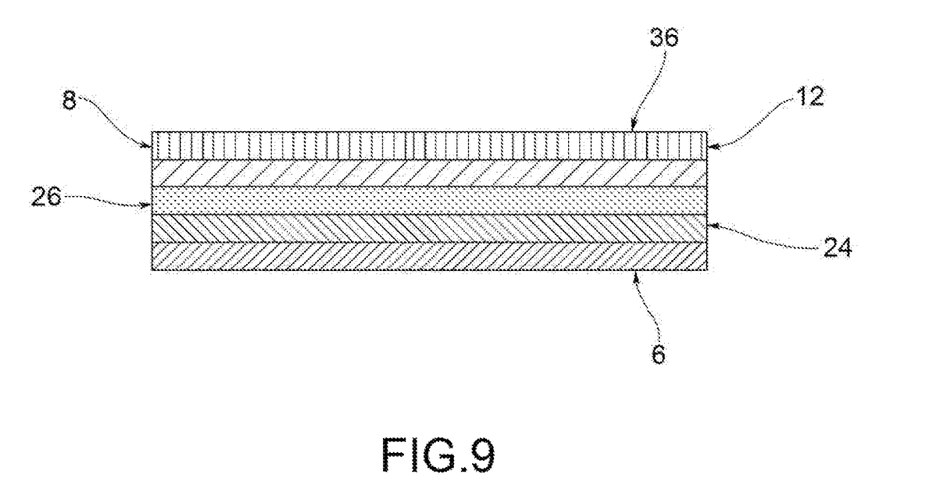
Figure 10:
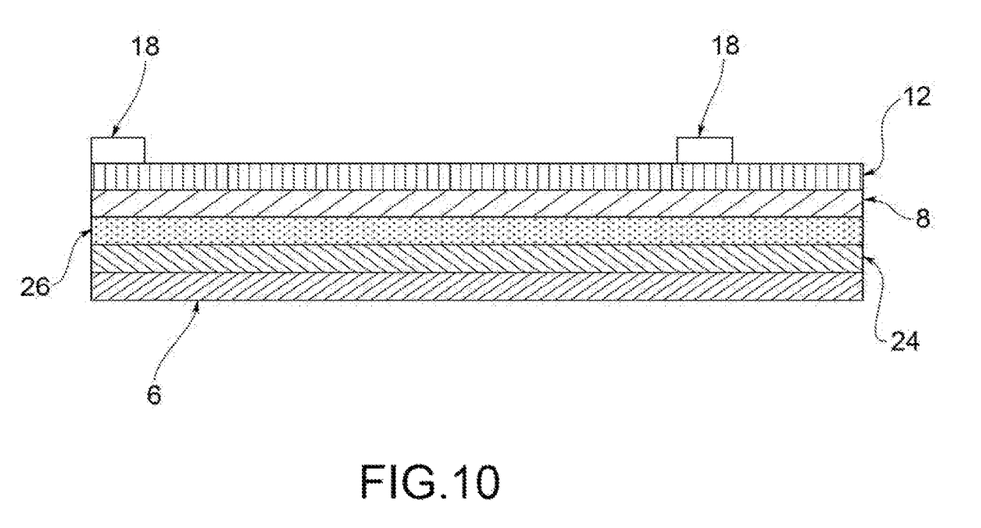
Figure 11:
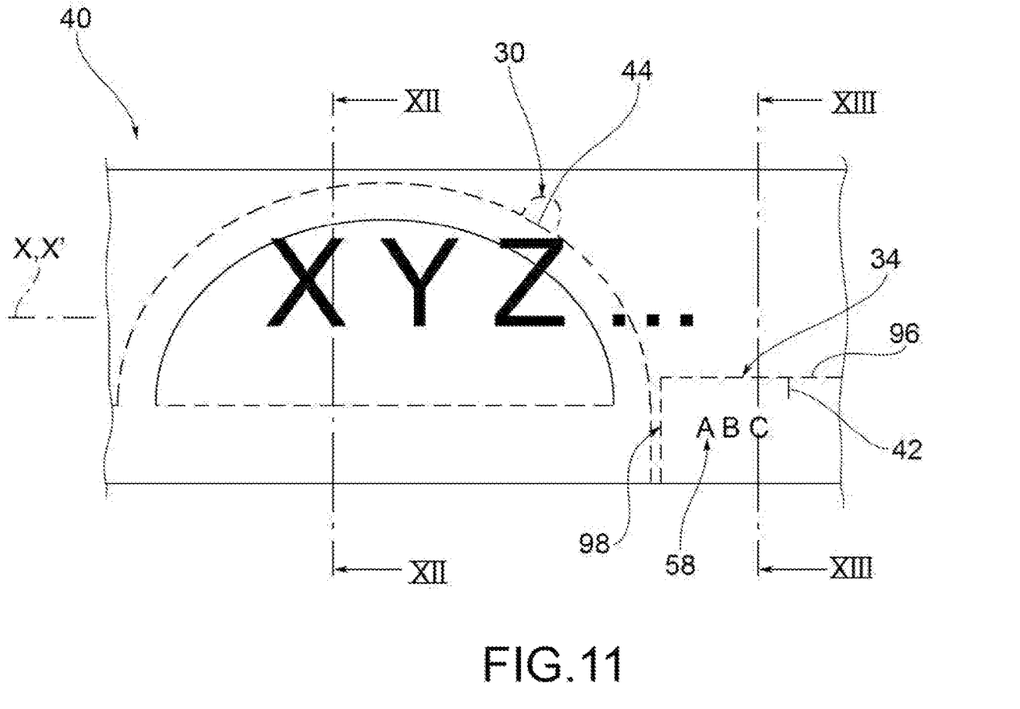

In this regard, protection masks may be used which prevent the coating of some areas 52 (FIG. 5) of the first front layer 8. A similar device could be used to prevent the coating of some areas 50 below the second front layer with the second detachment promoter layer 18, in order to obtain a non-sticky handle dry to the touch.

In contrast, FIG. 12 shows the double detachment promoter layer 12, 18 below the suspension handle 2 in the portions outside the anchor foot 46.

The second die cutting step 84 therefore has the function of creating the separation between adjacent labels 1, and the continuous swarf 86 will be shaped as a tape in which empty seats are formed (rectangular seats according to the embodiments shown), having a shape complementary to the label surround 38 of each label, interspersed with partitions corresponding to the material removed to divide labels 1.

Downstream of the elimination of the second continuous swarf 86, labels 1 have been formed and can be wrapped into a reel 92 (FIG. 1).

Innovatively, the method and the label object of the present invention allow overcoming the drawbacks of the prior art.

More precisely, the method and the label proposed allow obtaining a label with handle in a single production step, without having to perform special operations (such as gluing the handles one by one), in a simple, reliable and cost-effective manner.

Advantageously, the method and the label object of the present invention provide an innovative liquid or semi-liquid coating system and a subsequent solidification or curing aimed to create a passive layer for transfer below the handle.

Moreover, the handle can be handled without difficulty due to the dry contact.

Advantageously, the method and the label object of the present invention provide an important productive economy, not only by virtue of the raw materials involved in manufacture.

Advantageously, the method and the label object of the present invention allow a good grip on the handle and/or on the secondary label.

Advantageously, the method and the label object of the present invention provide an extremely cost-effective system to locate the handle without covering the below graphics.

Advantageously, the method and the label object of the present invention allow creating specific ergonomic portions to ensure easy interaction with the user.

Advantageously, the risk of breaking the handle or an arm thereof from the foot is virtually absent under normal operating conditions.

Advantageously, the method and the label object of the present invention provide an additional system to regulate the adhesive power of the lifting portions from the label surface.

Advantageously, the method and the label object of the present invention allow obtaining labels that can be applied as a continuous strip, so as to simplify the application on bottles in automated processes.

Advantageously, the method object of the present invention is cost-effective and the label described can be produced at low cost.

A man skilled in the art may make several changes or replacements of elements with other functionally equivalent ones to the embodiments of the above method and label in order to meet specific needs.

Also such variants are included within the scope of protection as defined by the following claims.

Moreover, each variant described as belonging to a possible embodiment may be implemented independently of the other variants described.

The invention claimed is:

1. A method of manufacturing a label with a suspension handle comprising steps of:
   i) providing a first layered material which comprises a support layer and a first front layer joined in a releasable manner;
   ii) coating a front surface of the first front layer with a first detachment promoter layer, leaving a free zone wherein said first detachment promoter layer is absent;
   iii) adjustably coating a handle area of the first detachment promoter layer with a second detachment promoter layer in a liquid or semi-liquid form;
   iv) providing a second layered material comprising a second front layer and an adhesive layer;
   v) when the second detachment promoter layer is still wet, joining products of steps iii) and iv) in a coupled material, so that the adhesive layer adheres at least to the free zone of the first layered material;
   vi) solidifying the second detachment promoter layer in contact with the adhesive layer to bind said second detachment promoter layer and said adhesive layer;
   vii) at least in a thickness of the second layer separating a suspension handle from the handle area, at least a secondary label of said label in a different area superposed only over the first detachment promoter layer, and forming a label surround in the first front layer.

2. Method according to claim 1, wherein the first layered material and a precursor of the second layered material comprise corresponding or substantially identical layers comprising, superposed to each other, a support layer, a de-adhesive layer, an adhesive layer and a first/second front layer, and wherein step iv) comprises a step of separating, and discarding, the support layer and the de-adhesive layer of said precursor upstream of step v).

3. Method according to claim 1, wherein the suspension handle comprises at least a grip portion comprising a portion protruding from an outer arched edge of said handle, wherein—in step iii)—the handle area also extends at said portion.

4. Method according claim 1, wherein step vii) comprises at least one sub-step of making at least one creasing line on the second front layer to deform said second layer and facilitate a lifting of a portion, peripheral of the secondary label and/or of suspension handle.

5. Method according to claim 3, wherein a creasing line is made at the grip portion to raise a peripheral portion thereof.

6. Method according to claim 1, wherein step vii) is conducted outside the free zone, so that in said free zone the second front layer forms a single anchor foot of the suspension handle, from which a pair of arms extend, connected in the form of a ring to each other.

7. Method according to claim 1, wherein, during step ii) and/or during step iii), the first front layer and/or the first detachment promoter layer are partially covered by one or more masks that prevent the coating of some zones with the first detachment promoter layer and/or with the second detachment promoter layer to modulate a separation force of an edge of the suspension handle and/or of a lifting portion of the secondary label.

8. Method according to claim 7, wherein at least one protection mask comprises dot-shaped protective elements, spaced along an extension of said edge and/or of said lifting portion with predetermined density.

9. Method according to claim 1, wherein the second front layer is at least partially transparent to reveal a graphic layer distributed on the first front layer upstream of step ii), and wherein the second detachment promoter layer comprises at least one colour or pigment to make evident at least part of the suspension handle.

10. Method according to claim 9, comprising a step of distributing a second graphic layer on the second front layer to reduce partially, or to eliminate, transparency of said second front layer at least at the secondary label.

11. Label with a suspension handle, made using the method according to claim 1, comprising:
   a first layered material which comprises a support layer and a first front layer joined in a releasable manner;
   a first detachment promoter layer, coating a front surface of the first front layer leaving a free zone wherein said first detachment promoter layer is absent;
   a second detachment promoter layer, adjustably coating a handle area of the first detachment promoter layer;
   a second layered material comprising a second front layer and an adhesive layer, said second material being joined to the first layered material so that the adhesive layer adheres at least to the free zone, and wherein the second detachment promoter layer is solidified in contact with the adhesive layer, in order to bind said second detachment promoter layer and said adhesive layer;
   wherein at least the thickness of the second layer defines a suspension handle at the handle area, a secondary label in a different area superposed only over the first layer detachment promoter, and wherein the first front layer forms a label surround.

12. Label according to claim 11, wherein the suspension handle comprises at least a grip portion comprising a portion protruding from an outer arched edge of said handle, wherein the handle area also extends at said portion.

13. Label according to claim 11, wherein the second front layer defines at least one creasing line to facilitate a lifting of a portion, peripheral of the secondary label and/or suspension handle.

14. Label according to claim 11, wherein, in the free zone, the second front layer comprises a single anchor foot of the suspension handle, from which a pair of arms extend, connected in the form of a ring to each other, said pair of arms being rotatable relative to said foot.

15. Label according to claim 11, wherein the second front layer is at least partially transparent to reveal a graphic layer distributed on the first front layer, and wherein the second detachment promoter layer comprises at least one colour or pigment to make evident at least part of the suspension handle.

16. Label according to claim 11, comprising a second graphic layer distributed on the second front layer to reduce partially, or to eliminate, transparency of said second front layer at least at the secondary label.

17. Label according to claim 11, wherein externally to the suspension handle and/or to the secondary label, the second front layer is absent, to create a lifting step around said handle and/or said secondary label.

\* \* \* \* \*